US011067725B2

(12) United States Patent
Lu et al.

(10) Patent No.: US 11,067,725 B2
(45) Date of Patent: Jul. 20, 2021

(54) MULTI-FOCAL COLLIMATING LENS AND HEADLIGHT ASSEMBLY FOR AN AUTOMOTIVE LOW BEAM

(71) Applicant: Lumileds LLC, San Jose, CA (US)

(72) Inventors: Kang Lu, Shanghai (CN); Ping Wu, Shanghai (CN); YiYu Cao, Shanghai (CN); Hui-Kai Hsu, Shanghai (CN)

(73) Assignee: Lumileds LLC, San Jose, CA (US)

( * ) Notice: Subject to any disclaimer, the term of this patent is extended or adjusted under 35 U.S.C. 154(b) by 0 days.

(21) Appl. No.: 16/494,764

(22) PCT Filed: Mar. 9, 2018

(86) PCT No.: PCT/EP2018/055901

§ 371 (c)(1),
(2) Date: Sep. 16, 2019

(87) PCT Pub. No.: WO2018/166911

PCT Pub. Date: Sep. 20, 2018

(65) Prior Publication Data

US 2020/0103564 A1 Apr. 2, 2020

(30) Foreign Application Priority Data

Mar. 17, 2017 (WO) ................ PCT/CN2017/077030
Apr. 18, 2017 (EP) .................................... 17166811

(51) Int. Cl.
*F21S 41/143* (2018.01)
*F21S 41/32* (2018.01)
(Continued)

(52) U.S. Cl.
CPC .............. *G02B 3/10* (2013.01); *F21S 41/143* (2018.01); *F21S 41/322* (2018.01); *F21Y 2115/10* (2016.08); *G02B 2003/0093* (2013.01)

(58) Field of Classification Search
CPC ........ F21S 41/322; F21S 41/143; G02B 3/10; G02B 2003/0093
See application file for complete search history.

(56) References Cited

U.S. PATENT DOCUMENTS 7,270,454 B2 * 9/2007 Amano ................ F21S 48/215 362/328
7,401,947 B2 * 7/2008 Wanninger ............ F21S 41/151 362/300

(Continued)

FOREIGN PATENT DOCUMENTS

CN 1734159 A 2/2006
CN 102162617 A 8/2011

(Continued)

OTHER PUBLICATIONS

EPO as ISA, "International Search Report and Written Opinion" dated May 30, 2018 from International Application No. PCT/EP2018/055901, filed Mar. 9, 2018, 12 pages.

(Continued)

*Primary Examiner* — Arman B Fallahkhair

(57) ABSTRACT

The embodiments of the invention provide a multi-focal collimating lens and a headlight assembly for an automotive low beam. The multi-focal collimating lens includes a central collimating lens portion and two total internal reflection lens portions arranged on a left side and a right side of the central collimating lens portion. The central collimating lens portion and the total internal reflection lens portions share two focal points symmetrically located on both sides of a vertical symmetry plane of the multi-focal collimating lens. An upper edge and a lower edge of the multi-focal collimating lens are formed based on the two focal points, so that the headlight assembly is able to generate a cut-off line of the automotive low beam in a far-field light pattern of the multi-focal collimating lens.

15 Claims, 6 Drawing Sheets

100 101 109 106 102 105 103 10 104 107 102 108

100 101 109 106 102 107 102

(51) Int. Cl.

| | |
|---|---|
| ***G02B 3/10*** | (2006.01) |
| *F21Y 115/10* | (2016.01) |
| *G02B 3/00* | (2006.01) |

(56) References Cited

U.S. PATENT DOCUMENTS

| | | | | |
|---|---|---|---|---|
| 7,580,192 | B1 | 8/2009 | Chu et al. | |
| 7,837,349 | B2 * | 11/2010 | Chinniah | G02B 19/0028 362/244 |
| 8,628,226 | B2 | 1/2014 | Takahashi et al. | |
| 8,801,242 | B2 * | 8/2014 | Hamm | F21S 41/151 362/487 |
| 8,820,979 | B2 | 9/2014 | Lee et al. | |
| 8,944,649 | B2 * | 2/2015 | Fedosik | F21S 41/147 362/511 |
| 9,618,182 | B2 | 4/2017 | Ebner et al. | |
| 9,719,649 | B2 * | 8/2017 | Wintzer | F21S 41/27 |
| 9,945,528 | B2 * | 4/2018 | Suwa | F21S 41/255 |
| 9,976,720 | B2 * | 5/2018 | Owada | F21S 41/176 |
| 10,288,248 | B1 * | 5/2019 | Crespin | F21S 41/148 |
| 10,352,523 | B2 * | 7/2019 | Nishimura | H01L 33/58 |
| 10,634,301 | B2 * | 4/2020 | Tessmer | F21S 41/147 |
| 10,890,307 | B2 * | 1/2021 | Lu | F21S 41/265 |
| 2006/0028829 | A1 | 2/2006 | Amano et al. | |
| 2007/0109791 | A1 | 5/2007 | Chinniah et al. | |
| 2008/0310159 | A1 | 12/2008 | Chinniah et al. | |
| 2011/0205748 | A1 | 8/2011 | Yatsuda | |
| 2012/0033441 | A1 * | 2/2012 | Sousek | F21S 43/243 362/555 |
| 2016/0084469 | A1 * | 3/2016 | Fukui | B60Q 1/28 362/521 |

FOREIGN PATENT DOCUMENTS

| | | | |
|---|---|---|---|
| CN | 102966914 | A | 3/2013 |
| CN | 103688207 | A | 3/2014 |
| CN | 103988110 | A | 8/2014 |
| EP | 1798467 | A1 | 6/2007 |
| EP | 3037716 | A1 | 6/2016 |
| JP | 2016058226 | A | 4/2016 |
| WO | 2015071529 | A1 | 5/2015 |
| WO | 2015/178155 | A1 | 11/2015 |
| WO | 2016198329 | A1 | 12/2016 |

OTHER PUBLICATIONS

Extended European Search Report dated Oct. 6, 2017 from European Patent Application No. 17166811.4, 8 pages.

Abstract corresponding to EP 2013909A2 entitled, "Optical Devices for Controlled Color Mixing", in the name of Applicant: Lamina Lighting Inc., Jan. 14, 2009, 1 page. Corresponding to U.S. publication No. 200710258694 Al, previously cited.

* cited by examiner

MULTI-FOCAL COLLIMATING LENS AND HEADLIGHT ASSEMBLY FOR AN AUTOMOTIVE LOW BEAM

CROSS-REFERENCE TO RELATED APPLICATIONS

The present application is a § 371 application of International Application No. PCT/EP2018/055901 filed on Mar. 9, 2018 and titled "MULTI-FOCAL COLLIMATING LENS AND HEADLIGHT ASSEMBLY FOR AN AUTOMOTIVE LOW BEAM," which claims the benefit of International Application No. PCT/CN2017/077030 filed Mar. 17, 2017 and European Patent Application No. 17166811.4 filed on Apr. 18, 2017. International Application No. PCT/EP2018/055901 and International Application No. PCT/CN2017/077030 and European Patent Application No. 17166811.4 are incorporated herein.

TECHNICAL FIELD

The present invention relates to the field of lighting, in particular to a multi-focal collimating lens and a headlight assembly for an automotive low beam.

BACKGROUND

Automotive headlights are typically required to operate in both a low beam (LB) and a high beam (HB) mode. The low beam mode is designed to restrict or constrain the upward projection of light, to avoid causing glare to oncoming road users. Low beam headlights are specified by local regulations. FIG. 1 is a schematic diagram illustrating a cut-off line 20 in a standard for automotive low beam. A low beam light generates a substantially horizontal upper cut-off line 20 in the projected light pattern, light is distributed in the region below the cut-off line 20. The cut-off line 20 typically sweeps or steps upward on the other side of the driver, so as to assist in illuminating road-signs and pedestrians.

Collimating lenses are widely used in the field of automotive headlights due to their compact size and high efficiency. For the application of high beam light or daytime running light (DRL), conventional collimators such as total internal reflection (TIR) lenses can be directly applied for collimating the light beam. However, since a low beam light requires a clear cut-off line, conventional collimating lenses cannot be directly applied in the headlight assembly for generating a low beam.

SUMMARY

Therefore, it is desirable to provide a collimating lens producing a clear cut-off line.

To this end, the embodiments of the invention provide a multi-focal collimating lens and a headlight assembly for an automotive low beam.

According to an aspect of the invention, a multi-focal collimating lens for a headlight assembly for an automotive low beam is provided. With the relative positions referring to the mounting position of the multi-focal collimating lens within the headlight assembly, the multi-focal collimating lens includes a central collimating lens portion and two total internal reflection lens portions arranged on a left side and a right side of the central collimating lens portion. The central collimating lens portion and the total internal reflection lens portions share two focal points symmetrically located on both sides of a vertical symmetry plane of the multi-focal collimating lens. An upper edge and a lower edge of the multi-focal collimating lens are formed based on the two focal points, so that a cut-off line of the automotive low beam is generated in a far-field light pattern of the multi-focal collimating lens.

With such two focal points, images of a light source can be respectively formed by different portions of the multi-focal collimating lens. Since the upper edge and lower edge of the multi-focal collimating lens are shaped based on the two focal points, these images constitute a far-field light pattern with a clear cut-off line.

Preferably, the two focal points are located on a horizontal bisection plane of the multi-focal collimating lens.

By arranging the two focal points on the horizontal bisection plane of the multi-focal collimating lens, the light source can be located or adjusted according to a desired tilt angle of the low beam, facilitating the design.

Preferably, a light incident surface of the central collimating lens portion includes an upper convex surface and a lower convex surface. The upper convex surface is formed by horizontally separating an upper portion of a convex lens. The lower convex surface is formed by horizontally squeezing a lower portion of the same convex lens.

With such an arrangement, the central collimating lens portion can be designed and manufactured on the basis of a conventional TIR lens. The upper convex surface and lower convex surface are respectively shaped by horizontally separating/squeezing respective portions of a convex lens. In such a manner, the simulation and determination for the two focal points can be simplified.

Preferably, the multi-focal collimating lens further includes a beam shaping element located on a light exit surface of the multi-focal collimating lens.

The light beam emitted from the multi-focal collimating lens has a clear cut-off line in the far field. It is also advantageous to expand or narrow the light beam in some applications. A beam shaping element can thus be located on the light exit surface of the multi-focal collimating lens to provide the desired shaping function, such as expanding, narrowing or local distortion.

Preferably, the beam shaping element includes a group of first cylindrical lenses arranged closely in parallel. A length direction of the first cylindrical lenses is parallel to the vertical symmetry plane of the multi-focal collimating lens.

The first cylindrical lenses can be applied for expanding the light beam emitted from the multi-focal collimating lens, while the clear cut-off line is maintained due to a zero diopter of the first cylindrical lenses in the vertical direction.

Preferably, the beam shaping element further includes a group of second cylindrical lenses arranged closely in parallel. The group of second cylindrical lenses corresponds to a left and/or right portion of the light exit surface. A predetermined angle is spanned between a length direction of the second cylindrical lenses and the length direction of the first cylindrical lenses.

To form a desired cut-off line sweeping upward on the other side of the driver, the second cylindrical lenses can be applied on the left and/or right portion of the light exit surface. With the shaping function of the second cylindrical lenses, a slanted portion of the cut-off line can be obtained without a complicated shape for the upper edge and lower edge of the multi-focal collimating lens.

Preferably, the beam shaping element comprises a Fresnel lens.

A Fresnel lens can be applied for further collimating the light beam, without increasing the weight of the optical structure.

Preferably, the beam shaping element is integrated on the light exit surface of the multi-focal collimating lens. Alternatively, the beam shaping element is a separate module. The optical design for the multi-focal collimating lens is thus relatively flexible.

According to another aspect of the invention, a headlight assembly is provided. The headlight assembly includes the multi-focal collimating lens according to the above mentioned embodiments and at least one light source. A lower side of the light source overlaps with a line connecting the two focal points.

With such a configuration, the design for the location of the light source can be simplified. In such a manner, the light source generates a desired far-field pattern with a clear cut-off line.

Preferably, the shape of the light source is a rectangle, triangle, or pentagon. The light source could be an LED light source, a high intensity discharge lamp or a filament lamp.

LED light sources are energy saving and can also be formed with a desired shape. Therefore, an LED light source can be applied in the headlight assembly for an improved efficiency.

By applying the above mentioned headlight assembly in a vehicle, an automotive low beam with a clear cut-off line can be obtained due to the inventive design of the multi-focal collimating lens.

BRIEF DESCRIPTION OF THE DRAWINGS

The present invention will now be described based on various embodiments with reference to the accompanying drawings, in which.

DETAILED DESCRIPTION

Reference will now be made to embodiments of the disclosure, one or more examples of which are illustrated in the figures. The embodiments are provided by way of explanation of the disclosure, and are not meant as a limitation of the disclosure. For example, features illustrated or described as part of one embodiment may be used with another embodiment to yield still a further embodiment. It is intended that the disclosure encompass these and other modifications and variations as come within the scope and spirit of the disclosure.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

Figure 2:
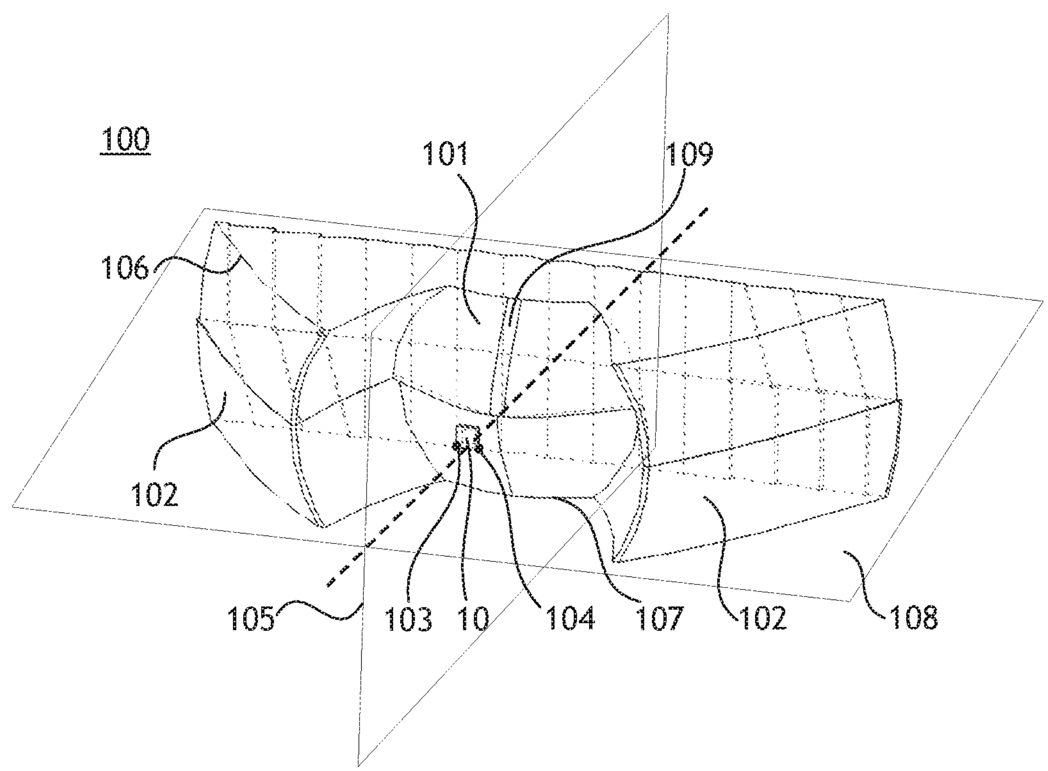
FIG. 2 is a schematic diagram of a multi-focal collimating lens according to an embodiment of the invention.

As shown in FIG. 2, an embodiment of the invention provides a multi-focal collimating lens 100 for a headlight assembly for an automotive low beam. With the relative positions referring to the mounting position of the multi-focal collimating lens within the headlight assembly, the multi-focal collimating lens 100 includes a central collimating lens portion 101 and two total internal reflection lens portions 102 arranged on a left side and a right side of the central collimating lens portion 101. The central collimating lens portion 101 and the total internal reflection lens portions 102 share two focal points 103 and 104 symmetrically located on both sides of a vertical symmetry plane 105 of the multi-focal collimating lens 100. An upper edge 106 and a lower edge 107 of the multifocal collimating lens 100 are formed based on the two focal points 103 and 104, so that a cut-off line of the automotive low beam is generated in a far-field light pattern of the multi-focal collimating lens 100.

With such two focal points, images of a light source can be respectively formed by different portions of the multi-focal collimating lens. Since the upper edge and lower edge of the multi-focal collimating lens are shaped based on the two focal points, these images constitute a far-field light pattern with a clear cut-off line.

Figure 3:
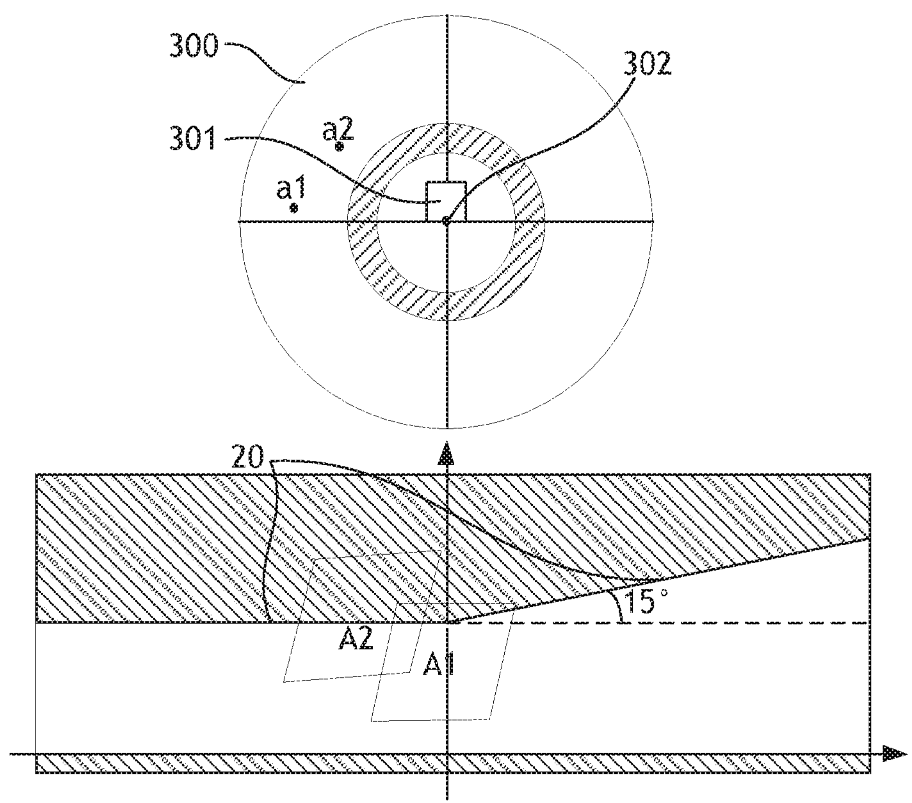
FIG. 3 shows a simulation result for far-field images of a light source formed by a TIR lens in the prior art.

FIG. 3 shows a simulation result for far-field images of a light source formed by a TIR lens 300 in the prior art. The upper portion of FIG. 3 illustrates the rear of the TIR lens 300 and a light source 301. The light beams emitted from the light source 301 are reflected by point a1 and point a2 on the surface of the TIR lens 300. For the TIR lens 300 in the prior art, only one focal point 302 is located on the intersection line of the vertical symmetry plane and the horizontal symmetry plane. Far-field images A1 and A2 of the light source 301 are formed with the light beams respectively reflected by point a1 and point a2. As can be seen from FIG. 3, the far-field images A1 and A2 are not completely located below the required cut-off line 20. Therefore, the TIR lens 300 in the prior art is not suitable for generating an automotive low beam.

Figure 1:
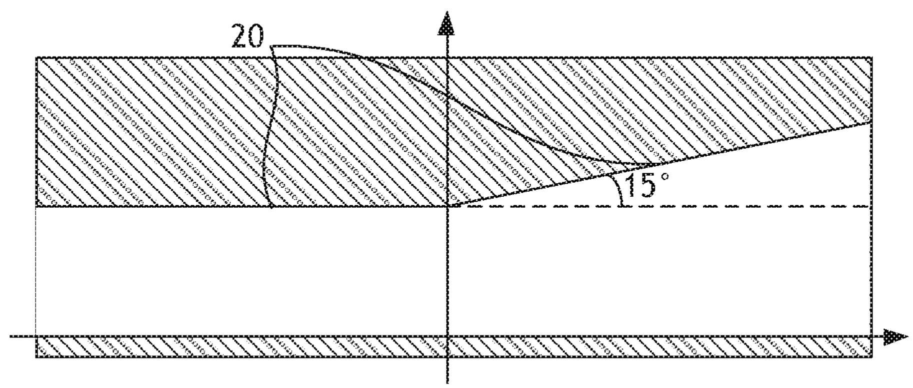
FIG. 1 is a schematic diagram illustrating a cut-off line in a standard for an automotive low beam.
Figure 4:
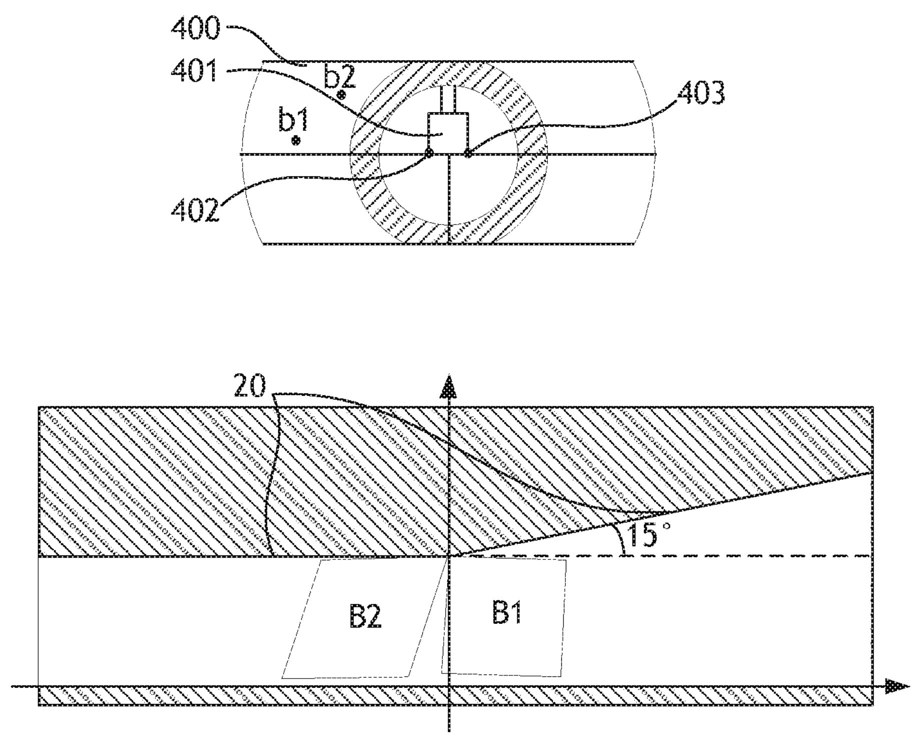
FIG. 4 shows a simulation result for far-field images of a light source formed by the multi-focal collimating lens according to an embodiment of the invention.

FIG. 4 shows a simulation result for far-field images of a light source 401 formed by the multi-focal collimating lens 400 according to an embodiment of the invention. The upper portion of FIG. 4 illustrates the rear of the multi-focal collimating lens 400 and a light source 401. The light beams emitted from the light source 401 are reflected by point b1 and point b2 on the surface of the multi-focal collimating lens 400. For the multi-focal collimating lens 400, two focal points 402 and 403 are symmetrically located on both sides of a vertical symmetry plane (as indicated with 105 in FIG. 1). In this embodiment of the invention, as shown in FIG. 4, the focal point 402 corresponds to the upper left portion and lower right portion of the multi-focal collimating lens 400, and the focal point 403 corresponds to the upper right portion and lower left portion of the multi-focal collimating lens 400. Far-field images B1 and B2 of the light source 401 are formed with the light beams respectively reflected by point b1 and point b2. As can be seen from FIG. 4, the far-field images B1 and B2 are completely located below the required cut-off line 20.

Figure 5:
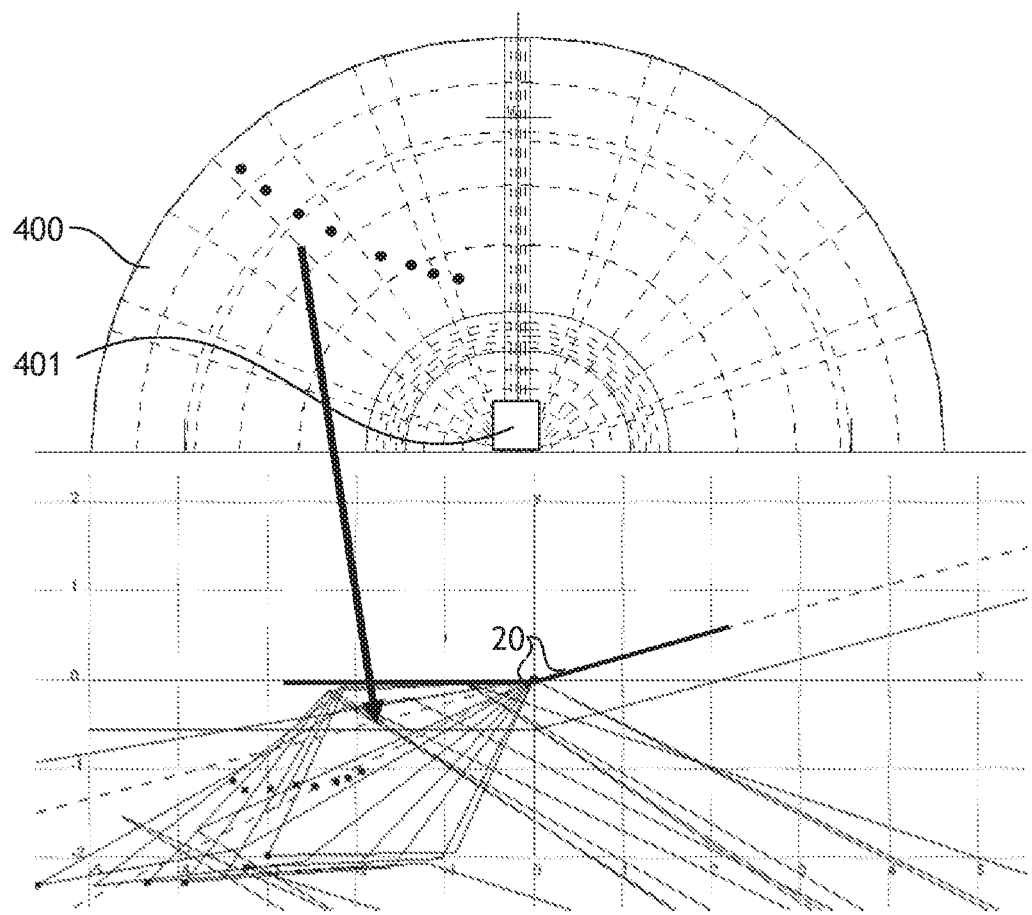
FIG. 5 and FIG. 6 show further simulation results for the embodiment of FIG. 4.
Figure 6:
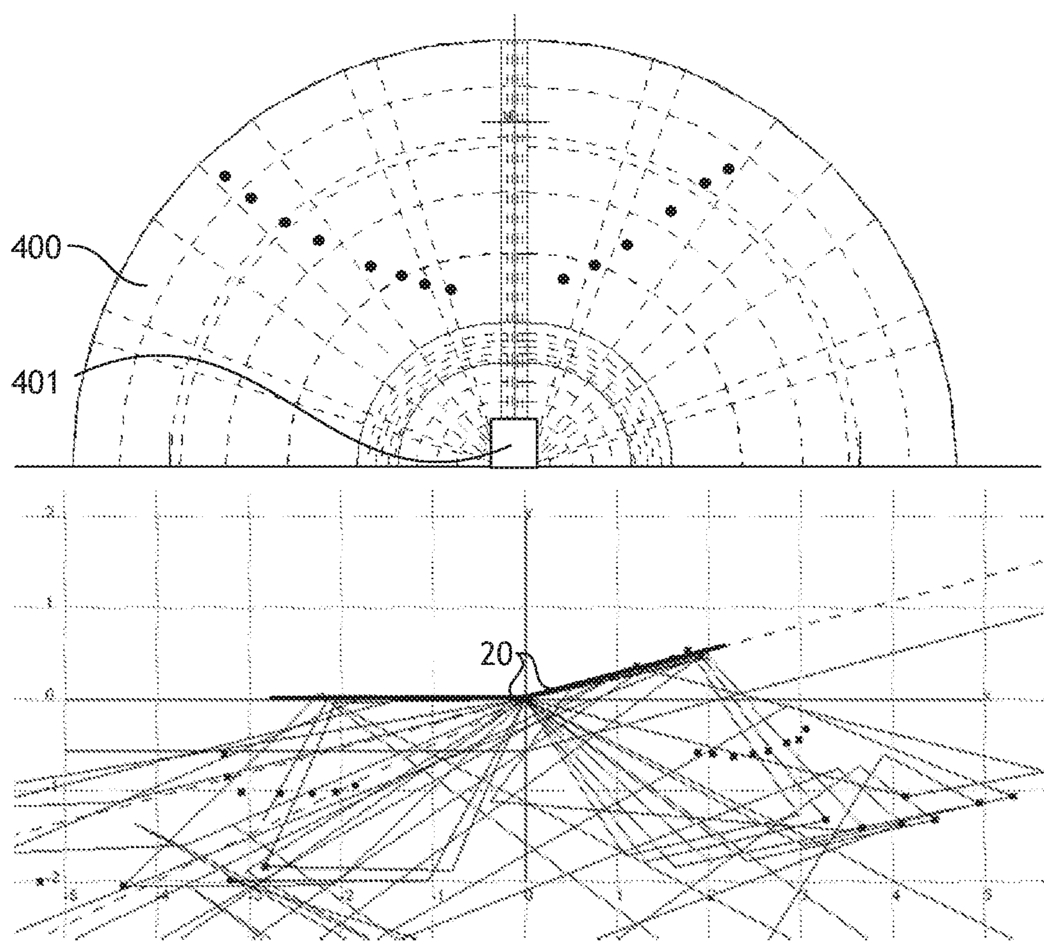

FIG. 5 and FIG. 6 show further simulation results for far-field images of the light source 401 formed by the multi-focal collimating lens 400 according to the embodiment of FIG. 4. As shown in FIG. 5, a plurality of quadrangles (i.e., the far-field images of the light source 401) are formed by some selected points on the multi-focal collimating lens 400, thereby forming a composite light pattern in the far field. The selected points on the multi-focal collimating lens 400 can be obtained by means of optical simulation such as ray tracing.

FIG. 6 illustrates the far-field images of the light source 401 and the selected points forming the complete upper edge of the multi-focal collimating lens 400 of the embodiment of FIG. 4. In this way, the selected points can be used to determine the upper edge and lower edge of the multi-focal collimating lens 400. Therefore, by applying optical simulation, the upper edge and lower edge of the multi-focal collimating lens can be determined based on the two focal points, so that a clear cut-off line 20 can be generated in the far field.

Though a precise upper edge or lower edge for the multi-focal collimating lens 400 can be obtained with the above mentioned optical simulation, the upper edge and lower edge can also be approximatively formed with two straight cutting lines on the multi-focal collimating lens as shown in FIG. 2 and FIG. 4.

In some embodiments, as shown in FIG. 2, the two focal points 103 and 104 are located on a horizontal bisection plane 108 of the multi-focal collimating lens 100.

By arranging the two focal points on the horizontal bisection plane of the multi-focal collimating lens, the light source can be located or adjusted according to a desired tilt angle of the low beam, facilitating the design.

Figure 7:
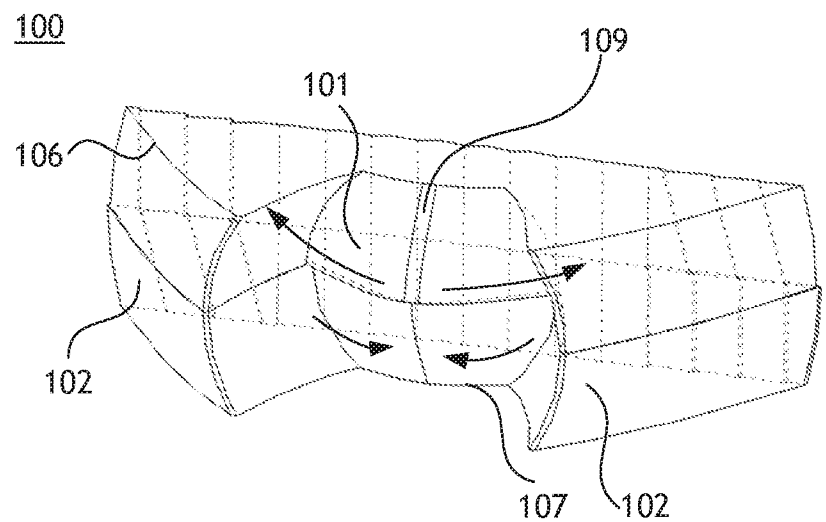
FIG. 7 is a schematic diagram illustrating the formation of an upper convex surface and lower convex surface in a multi-focal collimating lens according to an embodiment of the invention.

In some embodiments, as shown in FIG. 2 and FIG. 7, a light incident surface of the central collimating lens portion 101 includes an upper convex surface and a lower convex surface. The upper convex surface can be formed by horizontally separating an upper portion of a convex lens (indicated with the outward arrows in FIG. 7). The lower convex surface is formed by horizontally squeezing a lower portion of the same convex lens (indicated with the inward arrows in FIG. 7). A gap is generated by horizontally separating the upper portion of the convex lens, a curved surface 109 can be applied to fill the gap.

With such an arrangement, the central collimating lens portion can be designed and manufactured on the basis of a conventional TIR lens. The upper convex surface and lower convex surface are respectively shaped by horizontally separating/squeezing respective portions of a convex lens. In such a manner, the simulation and determination for the two focal points can be simplified.

Figure 8:
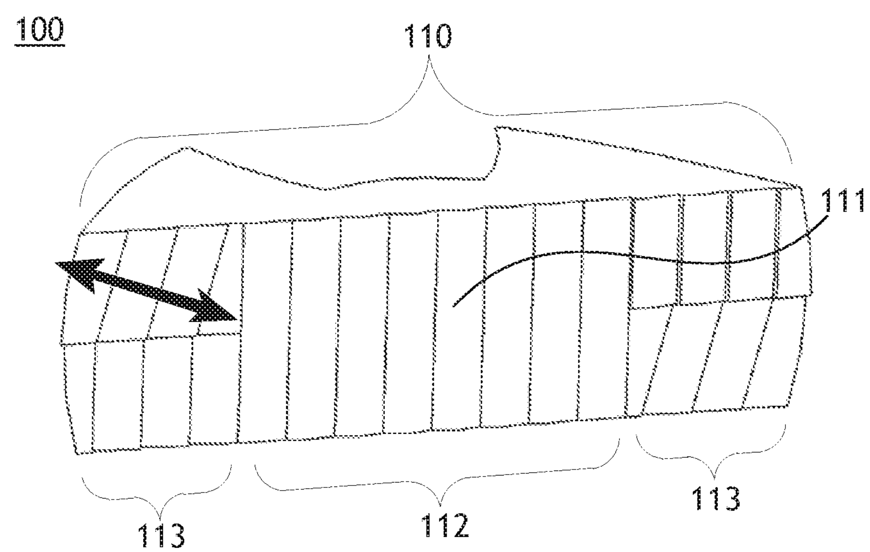
FIG. 8 is a schematic diagram illustrating a beam shaping element in a multi-focal collimating lens according to an embodiment of the invention.

FIG. 8 is a schematic diagram illustrating a beam shaping element 110 in a multi-focal collimating lens 100 according to an embodiment of the invention. FIG. 8 illustrates the front of the multi-focal collimating lens 100. The multi-focal collimating lens 100 further includes a beam shaping element 110 located on a light exit surface 111 of the multi-focal collimating lens 100.

The light beam emitted from the multi-focal collimating lens 100 has a clear cut-off line in the far field. It is also advantageous to expand or narrow the light beam in some applications. A beam shaping element can thus be located on the light exit surface 111 of the multi-focal collimating lens 100 to provide the desired shaping function, such as expanding, narrowing or local distortion.

In some embodiments, as shown in FIG. 8, the beam shaping element 110 includes a group of first cylindrical lenses 112 arranged closely in parallel. A length direction of the first cylindrical lenses 112 is parallel to the vertical symmetry plane (indicated with 105 in FIG. 1) of the multi-focal collimating lens 100.

The first cylindrical lenses 112 can be applied for expanding the light beam emitted from the multi-focal collimating lens 100, while the clear cut-off line is maintained due to a zero diopter of the first cylindrical lenses 112 in the vertical direction.

In some embodiments, as shown in FIG. 8, the beam shaping element 110 further includes a group of second cylindrical lenses 113 arranged closely in parallel. The group of second cylindrical lenses 113 correspond to a left and/or right portion of the light exit surface 111. A predetermined angle is enclosed between a length direction of the second cylindrical lenses 113 and the length direction of the first cylindrical lenses 112.

To form a desired cut-off line sweeping upward on the other side of the driver (as indicated with 20 in FIG. 1), the second cylindrical lenses 113 can be applied on the left and/or right portion of the light exit surface 111. With the expanding function (shown with the outward arrows in FIG. 8) of the second cylindrical lenses 113, a slanted portion of the cut-off line can be obtained without a complicated shape for the upper edge and lower edge of the multi-focal collimating lens.

In some embodiments, the beam shaping element comprises a Fresnel lens.

A Fresnel lens can be applied for further collimating the light beam, without increasing the weight of the optical structure.

In some embodiments, the beam shaping element is integrated on the light exit surface of the multi-focal collimating lens. Alternatively, the beam shaping element could be a separate module. The optical design for the multi-focal collimating lens is thus relatively flexible.

According to another aspect of the invention, a headlight assembly is provided. The headlight assembly includes the multi-focal collimating lens according to the above mentioned embodiments and at least one light source. As shown in FIG. 2, a lower side of the light source 10 overlaps with a line connecting the two focal points 103 and 104.

With such a configuration, the design for the location of the light source 10 can be simplified. As shown in FIG. 2, the light source 10 can be simply located based on the horizontal bisection plane 108 of the multi-focal collimating lens 100. In such a manner, the light source 10 generates a desired far-field pattern with a clear cut-off line.

In some embodiments, the shape of the light source is a rectangle, triangle, or pentagon. The light source may be an LED light source, a high intensity discharge lamp or a filament lamp.

LED light sources are energy saving and can also be formed with a desired shape. Therefore, an LED light source can be applied in the headlight assembly for an improved efficiency.

By applying the above mentioned headlight assembly, a clear cut-off line is formed in a far-field light pattern of the multi-focal collimating lens. The design principle for the upper edge and lower edge of the multi-focal collimating lens has been introduced with reference to FIGS. 4-6. Therefore, to meet the requirements in different local regulations, the specific shape of the cut-off line can be adjusted by designing the upper edge and lower edge with optical simulation.

By applying the above mentioned headlight assembly in a vehicle, an automotive low beam with a clear cut-off line can be obtained due to the inventive design of the multi-focal collimating lens.

Other variations to the disclosed embodiments can be understood and effected by those skilled in the art in practicing the claimed invention, from a study of the drawings, the disclosure, and the appended claims. In the claims, the word “comprising” does not exclude other elements or steps, and the indefinite article “a” or “an” does not exclude a plurality. The mere fact that certain measures are recited in mutually different dependent claims does not indicate that a combination of these measures cannot be used to advantage. Any reference signs in the claims should not be construed as limiting the scope.

REFERENCE SIGNS

10 light source
100 multi-focal collimating lens
101 central collimating lens portion
102 total internal reflection lens portions
103, 104 focal points
105 vertical symmetry plane
106 upper edge
107 lower edge
108 horizontal bisection plane
109 curved surface filling gap between horizontally separated upper lens portion
110 beam shaping element
111 light exit surface
112 first cylindrical lenses
113 second cylindrical lenses
20 cut-off line
300 TIR lens of prior art example
301 light source in prior art example
302 focal point of prior art TIR lens 300
a1, a2 reflection points on the surface of prior art TIR lens 300
A1, A2 far-field images of light source 301 in prior art example
400 multi-focal collimating lens
401 light source
402, 403 focal points
b1, b2 reflection points on the surface of multi-focal collimating lens 400
B1, B2 far-field images of light source 401

The invention claimed is:

1. A multi-focal collimating lens for a headlight assembly for an automotive low beam, the multi-focal collimating lens comprising:

a central collimating lens portion having a light incidence surface consisting of an upper convex surface and a lower convex surface, the lower convex surface consisting of a left portion and a right portion having same respective shapes as a left portion and a right portion of the upper convex surface, the upper convex surface comprising a gap positioned along a vertical center of the upper convex surface to separate the left portion of the upper convex surface from the right portion of the upper convex surface;

two total internal reflection lens portions respectively arranged on a left side and a right side of the central collimating lens portion such that the left side and the right side are on opposing sides of a vertical symmetry plane of the multi-focal collimating lens, the two total internal reflection lens portions and the central collimating lens portion collectively sharing two focal points symmetrically located on the opposing sides of the vertical symmetry plane; and an upper edge of the multi-focal collimating lens and a lower edge of the multi-focal collimating lens each having positions determined by the positions of the two focal points, so that the upper edge and the lower edge are positioned to define a cut-off line of the automotive low beam in a far-field light pattern of the multi-focal collimating lens, with light of the automotive low beam provided by at least one light source of the headlight assembly, the at least one light source overlapping a line connecting the two focal points.

2. The multi-focal collimating lens according to claim 1, further comprising a beam shaping element located on a light exit surface of the multi-focal collimating lens.

3. The multi-focal collimating lens according to claim 2, wherein the beam shaping element comprises a group of first cylindrical lenses arranged closely in parallel; and wherein a length direction of the first cylindrical lenses is parallel to the vertical symmetry plane of the multi-focal collimating lens.

4. The multi-focal collimating lens according to claim 3, wherein the beam shaping element further comprises a group of second cylindrical lenses arranged closely in parallel; wherein the group of second cylindrical lenses corresponds to at least one of left and right portions of the light exit surface; and wherein a length direction of the second cylindrical lenses and the length direction of the first cylindrical lenses comprise a predetermined angle.

5. The multi-focal collimating lens according to claim 2, wherein the beam shaping element comprises a Fresnel lens.

6. The multi-focal collimating lens according to claim 2, wherein the beam shaping element is integrated on the light exit surface of the multi-focal collimating lens.

7. The multi-focal collimating lens according to claim 2, wherein the beam shaping element is a separate module.

8. The headlight assembly comprising the multi-focal collimating lens according to claim 1 and the at least one light source, wherein a lower side of the light source overlaps with the line connecting the two focal points.

9. The headlight assembly according to claim 8, wherein a shape of the light source is a rectangle, triangle, or pentagon.

10. The headlight assembly according to claim 8, wherein the light source is an LED light source, a high intensity discharge lamp, or a filament lamp.

11. The multi-focal collimating lens according to claim 1, wherein the two focal points are located on a horizontal bisection plane of the multi-focal collimating lens.

12. The multi-focal collimating lens according to claim 1, wherein the central collimating lens portion is not perfectly symmetrical about a horizontal bisection plane of the multi-focal collimating lens.

13. The multi-focal collimating lens according to claim 1, wherein the upper edge and the lower edge are parallel to a horizontal bisection plane of the multi-focal collimating lens.

14. The multi-focal collimating lens according to claim 1, wherein at least one of the upper edge and the lower edge are curved with respect to the horizontal bisection plane of the multi-focal collimating lens.

15. The multi-focal collimating lens according to claim 1, wherein the gap comprises an additional curved surface separating the left portion of the upper convex surface from the right portion of the upper convex surface.

* * * * *